United States Patent
Kennedy et al.

(10) Patent No.: US 8,209,757 B1
(45) Date of Patent: Jun. 26, 2012

(54) DIRECT CALL INTO SYSTEM DLL DETECTION SYSTEM AND METHOD

(75) Inventors: Mark Kennedy, Redondo Beach, CA (US); Shane Pereira, Newbury Park, CA (US)

(73) Assignee: Symantec Corporation, Mountain View, CA (US)

( * ) Notice: Subject to any disclaimer, the term of this patent is extended or adjusted under 35 U.S.C. 154(b) by 688 days.

(21) Appl. No.: 12/163,747

(22) Filed: Jun. 27, 2008

Related U.S. Application Data

(63) Continuation-in-part of application No. 12/043,799, filed on Mar. 6, 2008, now Pat. No. 8,065,734.

(51) Int. Cl.
*G06F 21/00* (2006.01)

(52) U.S. Cl. .......................................... 726/23; 713/164

(58) Field of Classification Search ............... 726/22–27
See application file for complete search history.

(56) References Cited

U.S. PATENT DOCUMENTS

| | | | |
|---|---|---|---|
| 6,412,071 B1* | 6/2002 | Hollander et al. | ............... 726/23 |
| 8,065,734 B1* | 11/2011 | Kennedy | ........................... 726/23 |
| 2003/0021282 A1 | 1/2003 | Hospodor | |
| 2003/0191969 A1* | 10/2003 | Katsikas | ....................... 713/201 |
| 2004/0015712 A1 | 1/2004 | Szor | |
| 2004/0083388 A1* | 4/2004 | Nguyen | ........................ 713/201 |
| 2005/0149726 A1 | 7/2005 | Joshi et al. | |
| 2005/0198645 A1* | 9/2005 | Marr et al. | ..................... 719/310 |
| 2007/0136728 A1* | 6/2007 | Saito | ............................. 718/100 |

OTHER PUBLICATIONS

"Understanding the Import Address Table", pp. 1-6 [online]. Retrieved on Feb. 26, 2008 from the Internet: <URL:http://sandsprite.com/CodeStuff/Understanding_imports.html>. No author provided.
"Dynamic-link library", pp. 1-9 [online]. Retrieved on Feb. 27, 2008 from the Internet: <URL:http://en.wikipedia.org/wiki/Dynamic-link_library>. No author provided.
Kennedy, "Code Module Operating System (OS) Interactions Intercepting System and Method", U.S. Appl. No. 12/043,799, filed on Mar. 6, 2008.

* cited by examiner

*Primary Examiner* — Gilberto Barron, Jr.
*Assistant Examiner* — Malcolm Cribbs
(74) *Attorney, Agent, or Firm* — McKay and Hodgson, LLP; Serge J. Hodgson; Sean P. Lewis

(57) ABSTRACT

A method includes creating an intercept function for a tracked DLL function of a DLL being loaded into a suspicious module. Upon a determination that the tracked DLL function is invoked, a determination is made as to whether a return address of a caller of the tracked DLL function is within a legitimate return address range. The legitimate return address range includes an address range of the intercept function and excludes an address range of the suspicious module. If the return address is within the suspicious module, the suspicious module called the tracked DLL function directly. This indicates that the suspicious module is malicious and so protective action is taken.

18 Claims, 7 Drawing Sheets

Tracked DLL function legitimate return address range determination process 700

DIRECT CALL INTO SYSTEM DLL DETECTION SYSTEM AND METHOD

RELATED APPLICATION

This application is a continuation-in-part of Kennedy, U.S. patent application Ser. No. 12/043,799, filed on Mar. 6, 2008 now U.S. Pat. No. 8,065,734, entitled "CODE MODULE OPERATING SYSTEM (OS) INTERACTIONS INTERCEPTING SYSTEM AND METHOD", which is herein incorporated by reference in its entirety.

BACKGROUND

1. Field of the Invention

The present invention relates to computer system security. More particularly, the present invention relates to a system and method of intercepting operating system interactions by suspicious modules.

2. Description of the Related Art

Behavior blocking systems for protecting computer systems are well-known. Generally, a behavior blocking system monitors the behavior of a process. When the behavior of a process is determined by the behavior blocking system to be malicious, protective action is taken by the behavior blocking system to protect the associated computer system.

As an example of protective action, the process, which has been determined to be malicious by the behavior blocking system, is terminated.

A non process threat (NPT) is a malicious module that is injected into an otherwise non malicious process, sometimes called a victim process. Unfortunately, the behavior of the non process threat is attributed to the victim process by the behavior blocking system resulting in undesirable termination of the victim process. Further, in certain instances, the victim process cannot be terminated without damaging the computer system.

SUMMARY OF THE INVENTION

A method includes creating an intercept function for a tracked DLL function of a DLL being loaded into a suspicious module. Upon a determination that the tracked DLL function is invoked, a determination is made as to whether a return address of a caller of the tracked DLL function is within a legitimate return address range. The legitimate return address range includes an address range of the intercept function and excludes an address range of the suspicious module. If the return address is within the suspicious module, the suspicious module called the tracked DLL function directly. This indicates that the suspicious module is malicious and so protective action is taken.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 3:
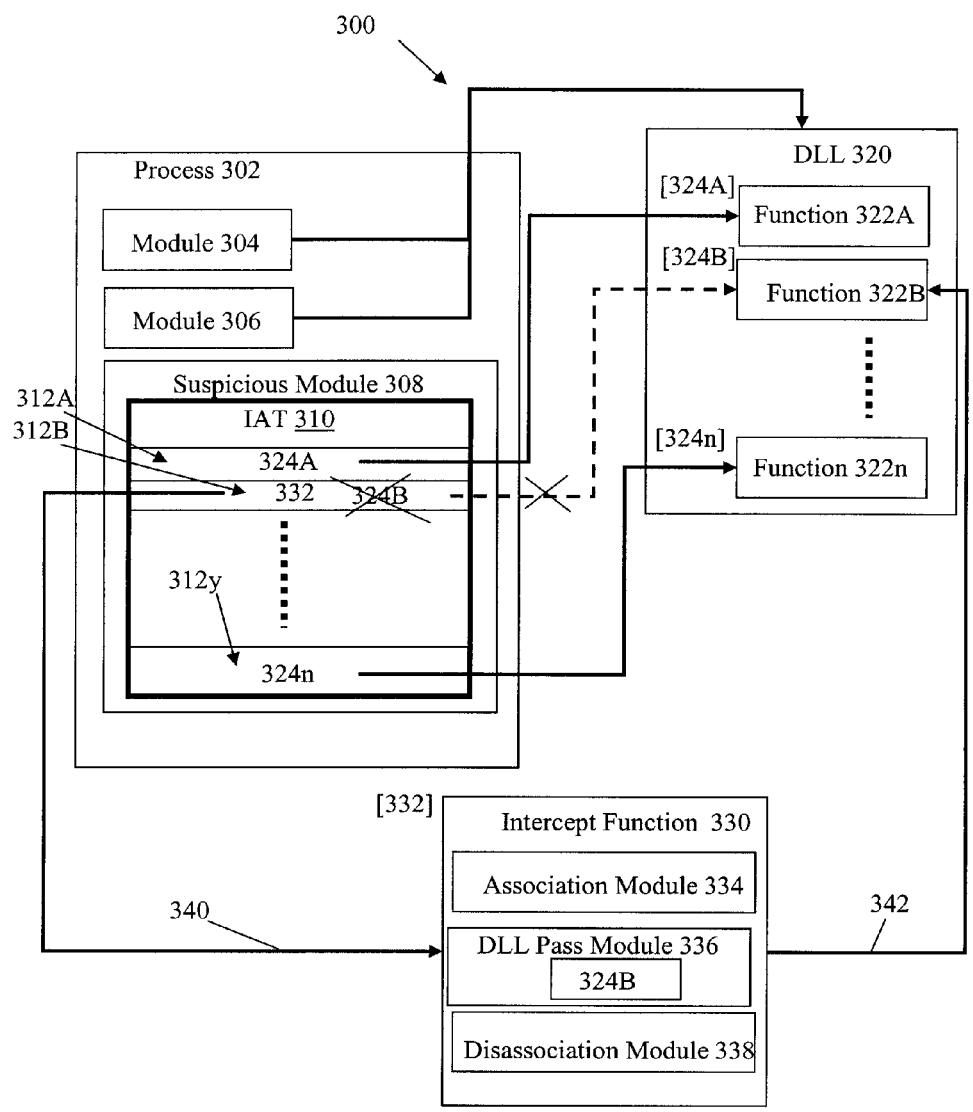
FIG. 3 is a block diagram of a memory structure in accordance with one embodiment.
Figure 5:
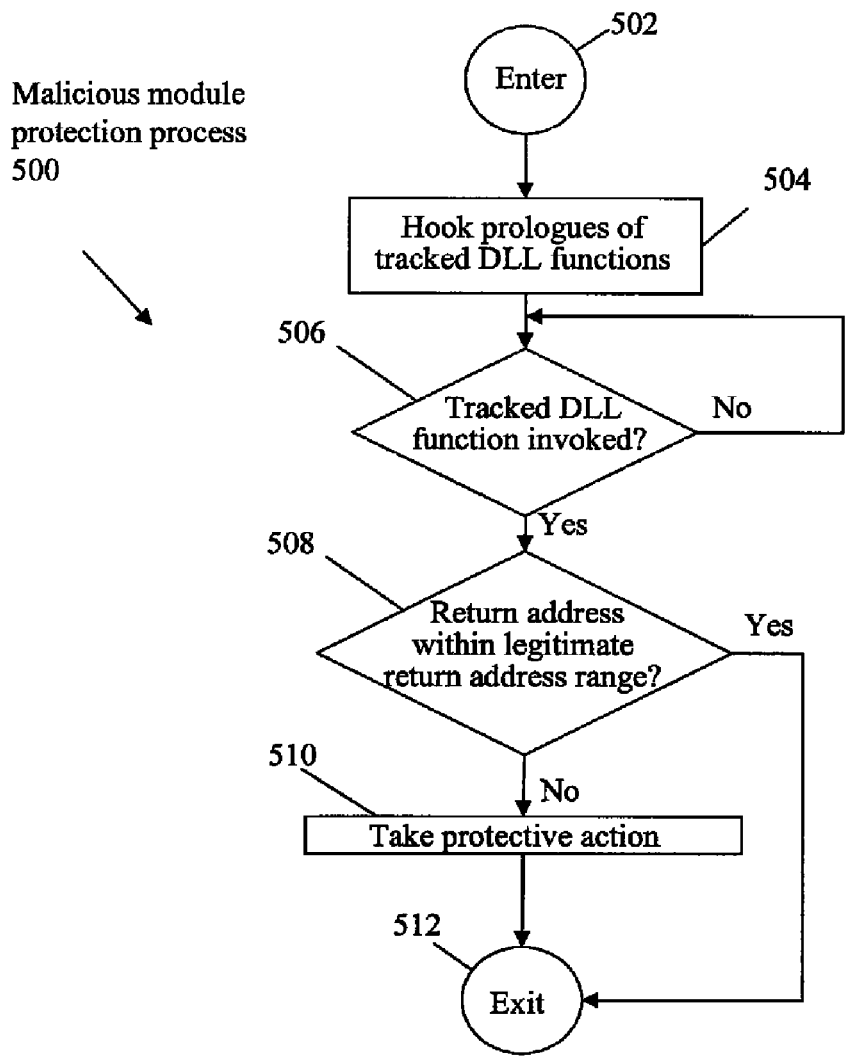
FIG. 5 is a flow diagram of a malicious module protection process in accordance with one embodiment.

As an overview, referring to FIGS. 3 and 5 together, a method includes creating an intercept function 330 for a tracked DLL function 322B of a DLL 320 being loaded into a suspicious module 308. Upon a determination that tracked DLL function 322B is invoked in a TRACKED DLL FUNCTION INVOKED CHECK OPERATION 506, a determination is made as to whether a return address of a caller of tracked DLL function 322B is within a legitimate return address range in a RETURN ADDRESS WITHIN LEGITIMATE RETURN ADDRESS RANGE CHECK OPERATON 508. The legitimate return address range includes an address range of intercept function 330 and excludes an address range of suspicious module 308. If the return address is within suspicious module 308, suspicious module 308 called tracked DLL function 322B directly. This indicates that suspicious module 308 is malicious and so protective action is taken in a TAKE PROTECTIVE ACTION OPERATION 510.

Figure 1:
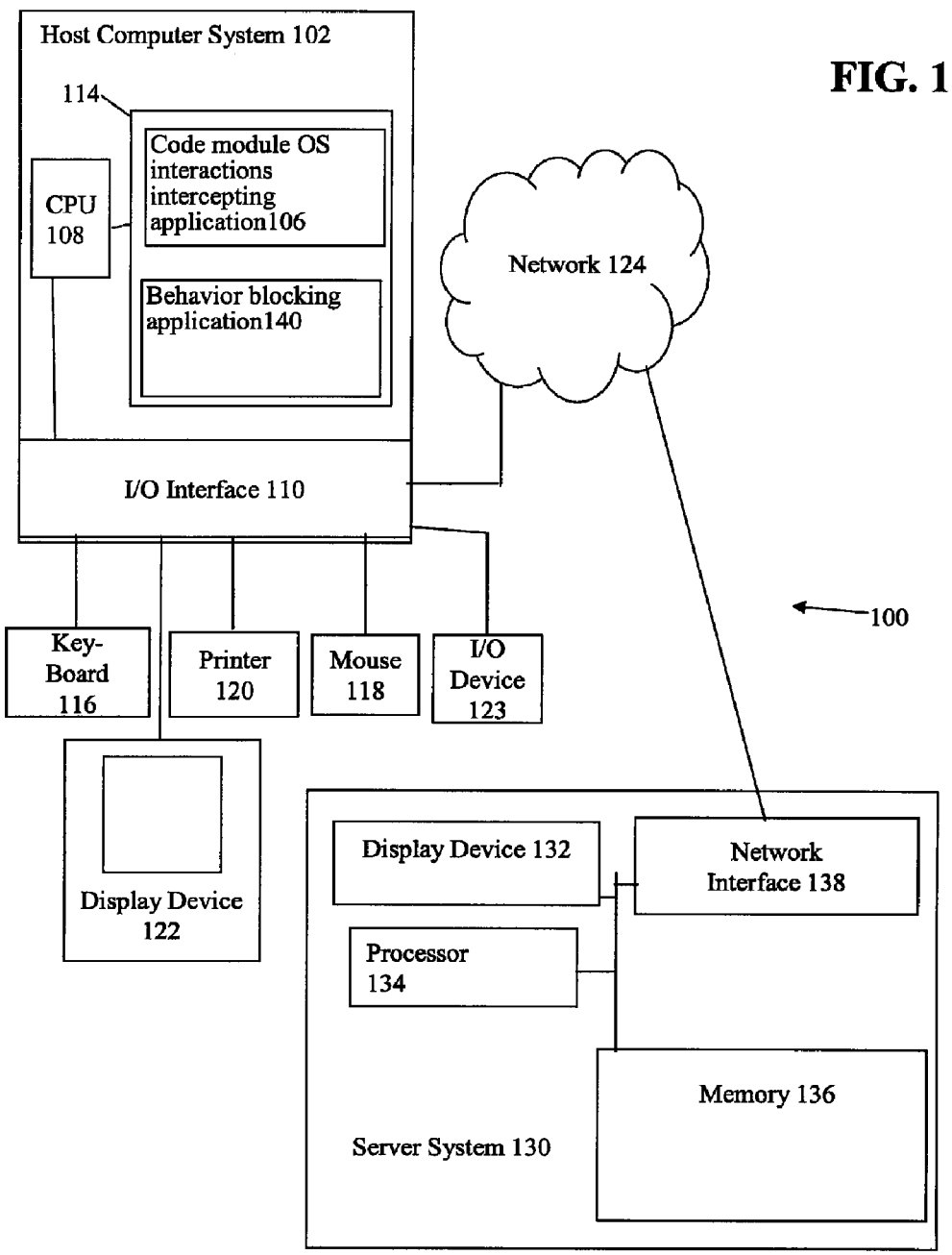
FIG. 1 is a diagram of a client-server system that includes a code module operating system (OS) interactions intercepting application and a behavior blocking application executing on a host computer system in accordance with one embodiment.

More particularly, FIG. 1 is a diagram of a client-server system 100 that includes a code module operating system (OS) interactions intercepting application 106 and a behavior blocking application 140 executing on a host computer system 102 in accordance with one embodiment. Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, code module OS interactions intercepting application 106 is loaded into host computer system 102 via I/O device 123, such as from a CD, DVD or floppy disk containing code module OS interactions intercepting application 106.

In one embodiment, memory 114 includes a page based virtual memory system that uses pages, e.g., 4096 byte memory areas. More particularly, Windows® operating systems provide page-based virtual memory management schemes that permit programs to realize a 4 GB (gigabyte) virtual memory address space. When the computer system processor is running in virtual memory mode, all addresses are assumed to be virtual addresses and are translated, or mapped, to physical addresses in main memory each time the processor executes a new instruction to access memory.

Conventionally, the 4 GB virtual memory address space is divided into two parts: a lower 2 GB user address space, also referred to as user mode address space or ring 3, available for use by a program; and, a high 2 GB system address space, also referred to as kernel address space or ring 0, reserved for use by the operating system.

To protect the integrity of the operating system code and other kernel address space code and data structures from errant or malicious programs and to provide efficient system security (user rights management), Windows® operating systems separate code executing in the user address space, e.g., user mode, from code executing in the kernel address space, e.g., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions.

In one embodiment, a user mode process includes one or more modules. In accordance with this embodiment, an in-memory version of a Portable Executable (PE) file that is loaded into memory via the Windows loader is known as a module. A PE file is an executable file format commonly used in Windows® systems.

Generally, a module includes an array of data structures, one per imported Dynamic Link Library (DLL). Each of these structures gives the name of the imported DLL and points to an array of function pointers. The array of function pointers is known as the Import Address Table (IAT).

Each imported function has an associated field in the IAT where the address of the function is written by the Windows® loader when the DLL is loaded into the module.

Host computer system 102 is coupled to a server system 130 of client-server system 100 by a network 124. Server system 130 typically includes a display device 132, a processor 134, a memory 136, and a network interface 138. Server system 130 may further include standard devices like a keyboard, a mouse, a printer, and an I/O device(s). The various hardware components of server system 130 are not illustrated to avoid detracting from the principles of this embodiment.

Network 124 can be any network or network system that is of interest to a user. In various embodiments, network interface 138 and I/O interface 110 include analog modems, digital modems, or a network interface card.

Code module OS interactions intercepting application 106 and behavior blocking application 140 are stored in memory 114 of host computer system 102 and executed on host computer system 102. The particular type of and configuration of host computer system 102 and server system 130 are not essential to this embodiment.

Figure 2:
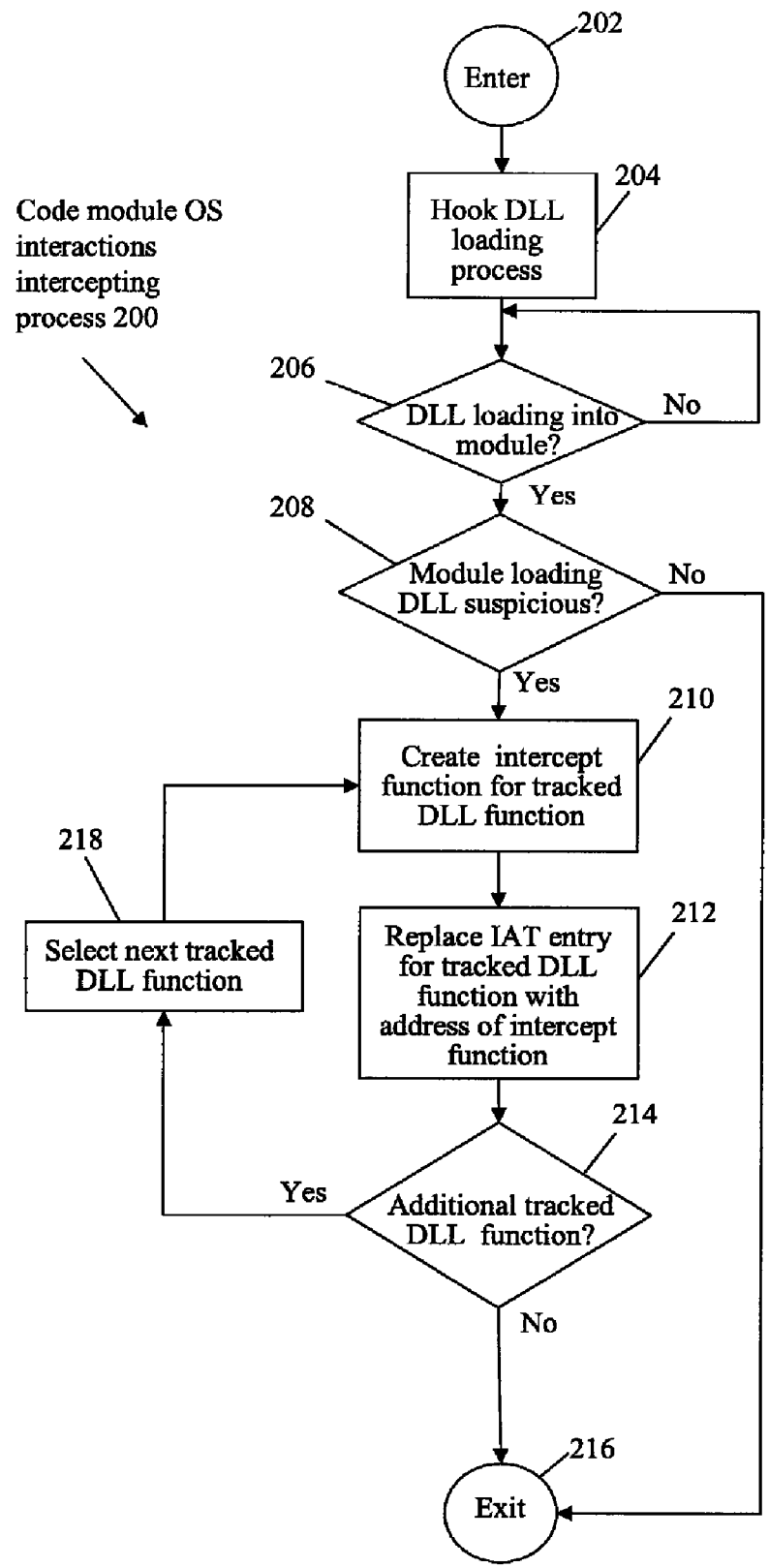
FIG. 2 is a flow diagram of a code module OS interactions intercepting process in accordance with one embodiment.

FIG. 2 is a flow diagram of a code module OS interactions intercepting process 200 in accordance with one embodiment. Referring now to FIGS. 1 and 2 together, execution of code module OS interactions intercepting application 106 by processor 108 results in the operations of code module OS interactions intercepting process 200 as described below in one embodiment.

From an ENTER OPERATION 202, flow moves to a HOOK DLL LOADING PROCESS OPERATION 204. In HOOK DLL LOADING PROCESS OPERATION 204, the DLL loading process of host computer system 102 is hooked.

A Dynamic Link library (DLL) is an implementation of a shared library concept. In one embodiment, DLLs are loaded by a Windows® loader, which is the DLL loading process in accordance with this example. Accordingly, in HOOK DLL LOADING PROCESS OPERATION 204, the Windows® loader, sometimes called DLL loader, is hooked.

In one embodiment, a system level, e.g., a kernel mode module, hooks the DLL loading process in kernel mode. Further, in one embodiment, the DLL loading process is hooked by redirecting calls to the DLL loading process, for example, to a hook module in accordance with an embodiment. In another embodiment, the DLL loading process is hooked by inserting a jump directly into the DLL loading process. Although various examples of hooking of the DLL loading process are set forth herein, other techniques of hooking DLL loading processes can be used as will be recognized by one of ordinary skill in the art having the benefit of this disclosure.

From HOOK DLL LOADING PROCESS OPERATION 204, flow moves to a DLL LOADING INTO MODULE CHECK OPERATION 206. In DLL LOADING INTO MODULE CHECK OPERATION 206, a determination is made as to whether a DLL is being loaded into a module. If a DLL is not being loaded into a module, flow remains at DLL LOADING INTO MODULE CHECK OPERATION 206. Conversely, if a DLL is being loaded into a module, flow moves from DLL LOADING INTO MODULE CHECK OPERATION 206 to a MODULE LOADING DLL SUSPICIOUS CHECK OPERATION 208. An example of a DLL loading into a module is set forth below in reference to FIG. 3. Generally, memory structure 300 of FIG. 3 is used as an example to illustrate the various operations of code module OS interactions intercepting process 200 of FIG. 2.

FIG. 3 is a block diagram of a memory structure 300 in accordance with one embodiment. Referring now to FIGS. 1, 2 and 3 together, a process 302, e.g., a user mode process, includes a plurality of modules including modules 304, 306, 308. Modules 304, 306 are non-malicious modules. Module 308 is a suspicious module, i.e., a module suspect of containing malicious code such as a non process threat. In one embodiment, malicious code is defined as any computer program, module, set of modules, or code that enters a computer system without an authorized user's knowledge and/or without an authorized user's consent.

Illustratively, behavior blocking application 140 determines whether a module is suspicious based on any one of a number of factors, the particular factors used are not essential to this embodiment. For example, the factors are configurable, e.g., by a user or system administrator.

A DLL 320 is associated with process 302. DLL 320 includes a plurality of functions 322A, 322B, . . . , 322$n$. Functions 322A, 322B, . . . , 322$n$ are located at virtual memory addresses 324A, 324B, . . . , 324$n$, respectively.

Module 304 includes an import address table (IAT) that include one or more of virtual memory addresses 324A, 324B, . . . , 324$n$ associated with one or more of functions 322A, 322B, . . . , 322$n$, respectively, imported into module 304. This import address table allows module 304 to call the particular imported functions 322A, 322B, . . . , 322$n$ in a conventional manner. Module 306 includes an import address table in a similar manner. These import address tables are not illustrated in FIG. 3 to avoid detracting from the principles of this embodiment.

Suspicious module 308 includes an import address table (IAT) 310 in accordance with one embodiment. Import address table 310 includes a plurality of function address fields 312A, 312B, . . . , 312$y$, i.e., virtual memory areas, e.g., 4 byte memory fields. Each of function address fields 312A, 312B, . . . , 312$y$ includes a memory address, i.e., a value, sometimes called an attribute, of a function in DLL 320.

To illustrate, function address field 312A includes memory address 324A, i.e., the address of function 322A in DLL 320. Similarly, function address field 312$y$ includes memory address 324$n$, i.e., the address of function 322$n$ in DLL 320.

Accordingly, each function address field 312A, 312B, ..., 312y includes a virtual memory address of a function in DLL 320 (unless the IAT entry is replaced as set forth below in OPERATION 212) and so is said to be associated with the respective function in DLL 320.

For purposes of illustration, assume the case where suspicious module 308 is being loaded into process 302. For example, a portable executable file is executed to load suspicious module 308 into process 302. As part of this loading of suspicious module 308, import address table 310 is created and function address fields 312A, 312B, ..., 312y are populated with the respective memory address, e.g., by the Windows® loader.

Stated another way, DLL 320 is loaded into suspicious module 308 by writing pointers to functions within DLL 320. More particularly, DLL 320 is loaded into suspicious module 308 by writing memory addresses 324A, 324B, ..., 324n of one or more of functions 322A, 322B, ..., 322n into memory address fields 312A, 312B, ..., 312y within import address table 310.

Accordingly, upon loading of suspicious module 308, a determination is made in DLL LOADING INTO MODULE CHECK OPERATION 206 that a DLL is loading into a module, i.e., DLL 320 is loading into suspicious module 308. Accordingly, flow moves to MODULE LOADING DLL SUSPICIOUS CHECK OPERATION 208.

In MODULE LOADING DLL SUSPICIOUS CHECK OPERATION 208, a determination is made as to whether the module loading the DLL is a suspicious module, i.e., a suspect module. As set forth above, in one embodiment, behavior blocking application 140 determines whether a module is suspicious based on any one of a number of factors.

If a determination is made that the module loading the DLL is not suspicious, flow moves to and exits at an EXIT OPERATION 216 or returns to DLL LOADING INTO MODULE CHECK OPERATION 206 and awaits the next DLL loading into a module.

Conversely, if a determination is made that the module loading the DLL is suspicious, flow moves to a CREATE INTERCEPT FUNCTION FOR TRACKED DLL FUNCTION OPERATION 210.

To illustrate with the example set forth in FIG. 3, a determination is made that suspicious module 308 that is loading DLL 320 is suspicious in MODULE LOADING DLL SUSPICIOUS CHECK OPERATION 208 and flow moves to CREATE INTERCEPT FUNCTION FOR TRACKED DLL FUNCTION OPERATION 210.

In CREATE INTERCEPT FUNCTION FOR TRACKED DLL FUNCTION OPERATION 210, an intercept function is created for a first tracked DLL function of the DLL being loaded by the suspicious module. In one embodiment, an intercept function, sometimes called stub tracking code or a proxy handler, is a function that intercepts calls to a tracked DLL function. The intercept function associates the actions of the tracked DLL function when called from the suspicious module to the suspicious module as discussed further below in reference to FIG. 4. After intercepting the call to the tracked DLL function, the intercept function passes the call to the tracked DLL function causing the DLL function to be executed. Upon return, the intercept function disassociates the actions of the tracked DLL function from the suspicious module.

A tracked DLL function is a DLL function that is of particular interest, e.g., a DLL function that is necessary or likely to be used by a malicious module. The determination of which DLL functions are to be tracked, i.e., which DLL functions are tracked DLL functions, is based on any one of a number of factors, the particular factors used are not essential to this embodiment. For example, the factors are configurable, e.g., by a user or system administrator. Examples of tracked DLL functions include the createfile function, the copyfile function, the createprocess function, the deletefile function, the terminateprocess function, and the registrykeycreate function although other DLL functions are tracked in other embodiments.

In accordance with one embodiment, the functions of a DLL include tracked DLL functions and untracked DLL functions. A DLL function is sometimes called an operating system (OS) function. Calls to DLL functions are sometimes called operating system interactions.

To illustrate with the example set forth in FIG. 3, function 322B of DLL 320 is a tracked DLL function. Note that function 322A and function 322n are untracked functions. Although a single tracked DLL function 322B of DLL 320 is set forth herein, in light of this disclosure, it is to be understood that a DLL such as DLL 320 includes several tracked DLL functions in other embodiments.

In CREATE INTERCEPT FUNCTION FOR TRACKED DLL FUNCTION OPERATION 210, intercept function 330 is created for tracked DLL function 322B.

From CREATE INTERCEPT FUNCTION FOR TRACKED DLL FUNCTION OPERATION 210, flow moves to a REPLACE IMPORT ADDRESS TABLE (IAT) ENTRY FOR TRACKED DLL FUNCTION WITH ADDRESS OF INTERCEPT FUNCTION OPERATION 212. In REPLACE IAT ENTRY FOR TRACKED DLL FUNCTION WITH ADDRESS OF INTERCEPT FUNCTION OPERATION 212, the IAT entry for the tracked DLL function is replaced with the address of the intercept function created in CREATE INTERCEPT FUNCTION FOR TRACKED DLL FUNCTION OPERATION 210. The IAT entry is the value, sometimes called attribute, contained within the function address field of the import address table associated with the tracked DLL function. As set forth above, the IAT entry is the virtual memory address of the tracked DLL function, although the IAT entry can be a value other than the virtual memory address of the tracked DLL function in other examples.

In one example, the IAT entry is written by the Windows® loader upon loading of the suspicious module into memory. For suspicious modules that attempt to use dynamic binding, e.g., by calling the GetProcAddress function, the dynamic binding calls are intercepted (sometimes called proxied), and the address of the intercept function is substituted for the value that otherwise would form the IAT entry. In one embodiment, the intercept function is created when the GetProcAddress function is called, i.e., OPERATIONS 210, 212 are performed when the GetProcAddress function is called.

By replacing the IAT entry for the tracked DLL function with the address of the intercept function, calls from the suspicious module to the tracked DLL function are rerouted to the intercept function. Generally, instead of control being passed to the tracked DLL function directly, control is passed to the intercept function.

To illustrate with the example set forth in FIG. 3, the IAT entry 324B (the memory address of tracked DLL function 322B) for tracked DLL function 322B in function address field 312B of import address table 310 is replaced with address 332 of interception function 330. Accordingly, instead of being directly passed to tracked DLL function 322B as indicated by the dashed arrow, a call from suspicious module 308 to tracked DLL function 322B is passed to interception function 330. Interception function 330, in turn, passes the call to tracked DLL function 322B.

From REPLACE IAT ENTRY FOR TRACKED DLL FUNCTION WITH ADDRESS OF INTERCEPT FUNCTION OPERATION 212, flow moves to an ADDITIONAL TRACKED DLL FUNCTION CHECK OPERATION 214. In ADDITIONAL TRACKED DLL FUNCTION CHECK OPERATION 214, a determination is made as to whether there are additional tracked DLL functions for which operations 210, 212 have not been performed.

If a determination is made that there are no additional tracked DLL functions for which operations 210, 212 have not been performed, i.e., an intercept function has been created for each tracked DLL function and the associated IAT entry replaced, flow moves to and exits at EXIT OPERATION 216 or returns to DLL LOADING INTO MODULE CHECK OPERATION 206 and awaits the next DLL loading into a module. Conversely, if a determination is made that there is at least one additional tracked DLL function for which operations 210, 212 have not been performed, flow moves to a SELECT NEXT TRACKED DLL FUNCTION OPERATION 218.

In SELECT NEXT TRACKED DLL FUNCTION OPERATION 218, the next tracked DLL function for which operations 210, 212 have not been performed is selected. Operations 210, 212 are then performed upon this selected tracked DLL function. Operations 214, 218, 210, 212 are repeatedly performed until an intercept function is created for each tracked DLL function and the associated IAT entry replaced and flow then exits at EXIT OPERATION 216.

In one embodiment, for purposes of cleanup, upon unloading of a DLL for which intercept function(s) have been created, e.g., unloading of the suspicious module, the intercept function(s) are also unloaded, sometimes called terminated. Accordingly, upon unloading of a suspicious module, the overhead associated with the intercept function(s) is also eliminated.

Figure 4:
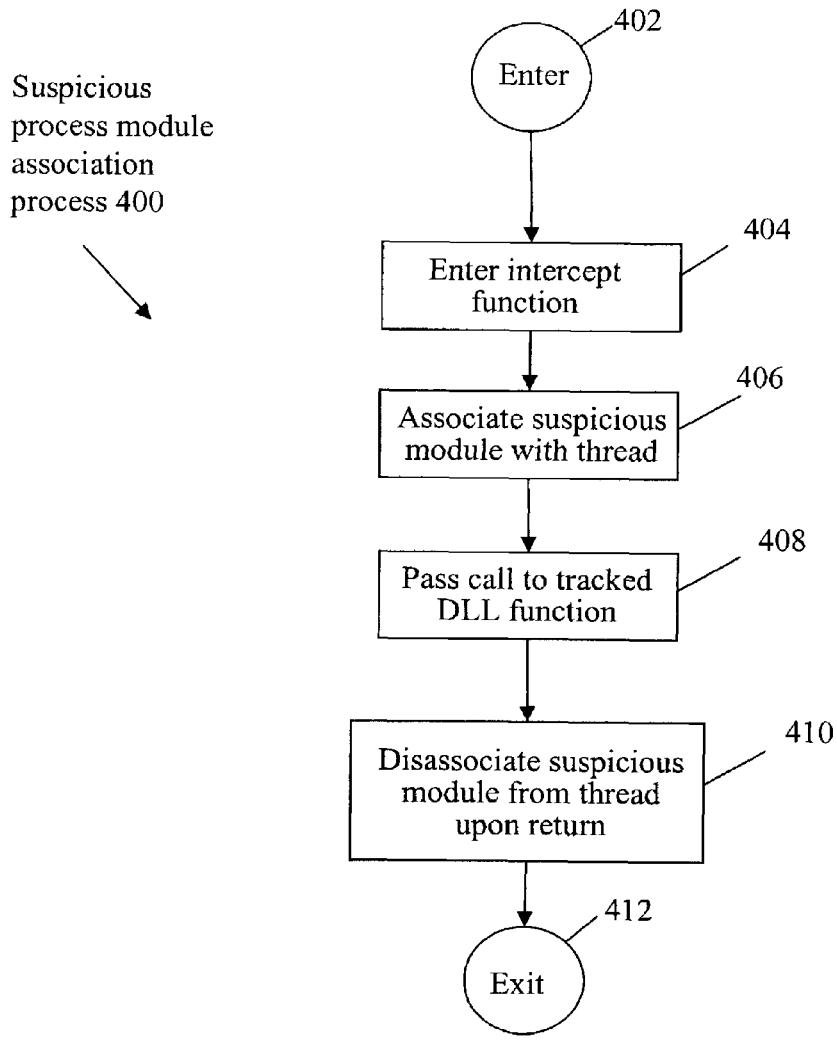
FIG. 4 is a flow diagram of a suspicious process module association process in accordance with one embodiment.

FIG. 4 is a flow diagram of a suspicious process module association process 400 in accordance with one embodiment. Referring now to FIGS. 1, 3 and 4 together, execution of code module OS interactions intercepting application 106 by processor 108 results in the operations of suspicious process module association process 400 as described below in one embodiment.

From an ENTER OPERATION 402, flow moves to an ENTER INTERCEPT FUNCTION OPERATION 404. In ENTER INTERCEPT FUNCTION OPERATION 404, the interception function is entered, i.e., control is passed to the intercept function. More particularly, a call is made by the suspicious module to the intercept function address contained within the respective memory address field in the import address table of the suspicious module. This causes the intercept function to be entered, i.e., control to be passed to the intercept function.

More generally, from the perspective of the suspicious module, the suspicious module makes a call to the tracked DLL function. This call is intercepted by the intercept function.

To illustrate with the example set forth in FIG. 3, suspicious module 308 makes a call 340 to intercept function address 332 in function address field 312B. This causes interception function 330 to be entered in ENTER INTERCEPT FUNCTION OPERATION 404.

From ENTER INTERCEPT FUNCTION OPERATION 404, flow moves to an ASSOCIATE SUSPICIOUS MODULE WITH THREAD OPERATION 406. In ASSOCIATE SUSPICIOUS MODULE WITH THREAD OPERATION 406, the suspicious module that cause the intercept function to be entered is associated with the thread presently executing. Threads are a way for a program to fork (or split) itself into two or more simultaneously (or pseudo-simultaneously) running tasks. In general, a thread is contained inside a process and different threads of the same process can share some resources.

Accordingly, in ASSOCIATE SUSPICIOUS MODULE WITH THREAD OPERATION 406, any actions associated with the thread are attributed to the suspicious module, e.g., by behavior blocking application 140. Thus, actions are associated to a suspicious module instead of to a process containing the suspicious module, allowing the behavior blocking application to make decisions with regards to the suspicious module causing the actions, instead of the more general process.

To illustrate, Internet Explorer® allows a module, e.g., an Active X control, to be loaded therein. In accordance with this embodiment, the actions of the Active X control, e.g., a suspicious module, are associated to the Active X control instead of to Internet Explorer®, the more general process.

In one embodiment, based upon the actions of the suspicious module, protective action is taken by the behavior blocking application. For example, the general process is restarted while reloading of the suspicious module, e.g., a non process threat (NPT), into the general process is prevented.

To illustrate with the example set forth in FIG. 3, intercept function 330 includes an association module 334, a DLL pass module 336, and a disassociation module 338. Association module 334 associates the actions of the thread presently executing to suspicious module 308 in ASSOCIATE SUSPICIOUS MODULE WITH THREAD OPERATION 406.

From ASSOCIATE SUSPICIOUS MODULE WITH THREAD OPERATION 406, flow moves to a PASS CALL TO TRACKED DLL FUNCTION OPERATION 408. In PASS CALL TO TRACKED DLL FUNCTION OPERATION 408, the call from the suspicious module that is intercepted by the intercept function is passed to the tracked DLL function in the DLL.

To illustrate with the example set forth in FIG. 3, DLL pass module 336 includes memory address 324B of tracked DLL function 322B. Memory address 324B was read into intercept function 330 during creation of interception function 330. DLL pass module 336 makes a call 342 from intercept function 330 to memory address 324B thus passing call 340 from suspicious module 308 to tracked DLL function 322B as call 342. This causes tracked DLL function 322B to be executed. Accordingly, any actions associated with execution of tracked DLL function 322B are attributed to suspicious module 308.

To illustrate, assume the case where tracked DLL function 322B is the copyfile function. Accordingly, upon execution of tracked DLL function 322B, several kernel mode functions are executed such as, for example, a createfile function, an openfile function, a read function, a write function, and a closefile function. All of these functions are attributed to suspicious module 308.

From PASS CALL TO TRACKED DLL FUNCTION OPERATION 408, flow moves to a DISASSOCIATE SUSPICIOUS MODULE FROM THREAD UPON RETURN OPERATION 410. In DISASSOCIATE SUSPICIOUS MODULE FROM THREAD UPON RETURN OPERATION 410, upon return of the tracked DLL function, the suspicious module that called the tracked DLL function is disassociated with the thread. Accordingly, any further actions of the thread are not associated to the suspicious module. From DISASSOCIATE SUSPICIOUS MODULE FROM THREAD UPON RETURN OPERATION 410, flow moves to and exits at an EXIT OPERATION 412.

To illustrate with the example set forth in FIG. 3, upon return from tracked DLL function 322B, control transfers to intercept function 330. Upon transfer of control, disassociation module 338 disassociates suspicious module 308 from the thread. Upon return of intercept function 330, control transfers to suspicious module 308.

As set forth above, a tracked DLL function is legitimately called from either: (1) a non-suspicious module; or (2) an intercept function. In no legitimate event should a tracked DLL function be directly called from a suspicious module.

More particularly, if a tracked DLL function is called from a non-suspicious module, a return address is pushed onto the call stack, the return address being an address within the non-suspicious module. Upon completion of the tracked DLL function, the return address is popped from the call stack. Control is then transferred to the non-suspicious module located at the return address.

Further, if a tracked DLL function is called from a suspicious module, the call is intercepted by an intercept function. The intercept function, in turn, calls the tracked DLL function. A return address is pushed onto the call stack, the return address being an address within the intercept function. Upon completion of the tracked DLL function, the return address is popped from the call stack. Control is then transferred to the intercept function located at the return address. Although a call stack is set forth herein, a return address can be stored in any one of a number of data structures depending, for example, upon the particular operation system.

Thus, in no legitimate event should a tracked DLL function be directly called from a suspicious module. Accordingly, if a tracked DLL function is directly called from a suspicious module, the suspicious module is deemed malicious based on this illegitimate behavior as set forth below in reference to FIG. 5. For example, if the import address table and/or GetProcAddress function is bypassed by a suspicious module to directly call the tracked DLL function, the suspicious module is deemed malicious based on this illegitimate behavior as set forth below in reference to FIG. 5.

FIG. 5 is a flow diagram of a malicious module protection process 500 in accordance with one embodiment. Referring now to FIGS. 1 and 5 together, execution of code module OS interactions intercepting application 106 by processor 108 results in the operations of malicious module protection process 500 as described below in one embodiment.

From an ENTER OPERATION 502, flow moves to a HOOK PROLOGUES OF TRACKED DLL FUNCTIONS OPERATION 504. In HOOK PROLOGUES OF TRACKED DLL FUNCTIONS OPERATION 504, prologues of tracked DLL functions are hooked. A prologue is typically the first few instructions of a tracked DLL function which prepare for execution of the tracked DLL function. For example, a prologue prepares the stack for execution of the tracked DLL function although the prologue performs other actions in other examples.

In one embodiment, jump instructions, sometimes called a trampoline function, are inserted into the tracked DLL functions in HOOK PROLOGUES OF TRACKED DLL FUNCTIONS OPERATION 504. Accordingly, upon entry of a tracked DLL function, the jump instruction is executed causing control to be transferred, e.g., to a hook module of code module OS interactions intercepting application 106. Accordingly, regardless of how a tracked DLL function is entered, control is intercepted to allow for a determination of whether the call to the tracked DLL function is legitimate or malicious. Although use of jump instructions are set forth herein, in other embodiments, a prologue of a tracked DLL function is hooked using another technique, and the particular technique used is not essential.

From HOOK PROLOGUES OF TRACKED DLL FUNCTIONS OPERATION 504, flow moves to a TRACKED DLL FUNCTION INVOKED CHECK OPERATION 506. In TRACKED DLL FUNCTION INVOKED CHECK OPERATION 506, a determination is made as to whether a tracked DLL function has been invoked.

To illustrate, a caller calls a tracked DLL function. Generally, the caller is the instruction or set of instructions that originated the tracked DLL function call to the tracked DLL function. In one embodiment, upon entry into the tracked DLL function as a result of the tracked DLL function call, the jump instruction inserted into the tracked DLL function in HOOK PROLOGUES OF TRACKED DLL FUNCTIONS OPERATION 504 is executed causing control to be transferred to a hook module in accordance with one embodiment. This results in a conclusion that a tracked DLL function has been invoked.

If a tracked DLL function has not been invoked, flow remains at TRACKED DLL FUNCTION INVOKED CHECK OPERATION 506. Conversely, if a tracked DLL function has been invoked, flow moves from TRACKED DLL FUNCTION INVOKED CHECK OPERATION 506 to a RETURN ADDRESS WITHIN LEGITIMATE RETURN ADDRESS RANGE CHECK OPERATION 508.

In RETURN ADDRESS WITHIN LEGITIMATE RETURN ADDRESS RANGE CHECK OPERATION 508, a determination is made as to whether the return address is within a legitimate return address range.

As discussed above, a return address is pushed onto the call stack when a call to a tracked DLL function is made. The return address is a pointer to a memory location where control is to be returned upon completion of the tracked DLL function. This return address is read from the call stack. This return address is then compared to a legitimate return address range of legitimate return addresses to determine whether the return address is a legitimate return address.

In one embodiment, the legitimate return address range includes the address ranges of non-suspicious modules and intercept functions. An example of such a legitimate return address range is set forth below in reference to FIG. 6. In another embodiment, the legitimate return address range includes any address except the address ranges of suspicious modules, i.e., excludes the address range of the suspicious module. An example of such a legitimate return address range is set forth below in reference to FIG. 7.

Accordingly, if the return address is within the legitimate return address range, a determination is made that the return address is a legitimate return address in RETURN ADDRESS WITHIN LEGITIMATE RETURN ADDRESS RANGE CHECK OPERATION 508. In this event, flow moves from RETURN ADDRESS WITHIN LEGITIMATE RETURN ADDRESS RANGE CHECK OPERATION 508 to an EXIT OPERATION 512 and exits. Accordingly, upon verifying that the return address is legitimate, no further action is taken.

Conversely, if the return address is not within a legitimate return address range, a determination is made that the return address is illegitimate, sometimes called malicious. In this event, flow moves from RETURN ADDRESS WITHIN LEGITIMATE RETURN ADDRESS RANGE CHECK OPERATION 508 to a TAKE PROTECTIVE ACTION OPERATION 510.

In TAKE PROTECTIVE ACTION OPERATION 510, protective action is taken. In one embodiment, execution of the tracked DLL function is prevented. In another embodiment, the caller, e.g., suspicious module, that directly called the tracked DLL function is defined as a malicious module. In accordance with this embodiment, the general process that includes the malicious module is restarted while reloading of the malicious module, e.g., a non process threat (NPT), into the general process is prevented.

From TAKE PROTECTIVE ACTION OPERATION 510, flow moves to and exits at EXIT OPERATION 512.

To illustrate the operations of malicious module protection process 500 with the example set forth in FIG. 3, referring now to FIGS. 3 and 5 together, the prologue of tracked DLL function 322B is hooked, e.g., by inserting a jump instructions into tracked DLL function 322B, in HOOK PROLOGUES OF TRACKED DLL FUNCTIONS OPERATION 504. In TRACKED DLL FUNCTION INVOKED CHECK OPERATION 506, a call is made to tracked DLL function 322B and a return address of the caller is pushed onto a call stack.

In RETURN ADDRESS WITHIN LEGITIMATE RETURN ADDRESS RANGE CHECK OPERATION 508, the return address is read or otherwise determined. In one embodiment, a determination is made as to whether the return address is an address within non-suspicious modules 304, 306 or intercept function 330, i.e., is within the legitimate return address range. In another embodiment, a determination is made as to whether the return address is not within suspicious modules 308, i.e., is within the legitimate return address range.

In one embodiment, if the return address is within modules 304, 306, or intercept function 330, i.e., is within a legitimate return address range, no further action is taken and flow exits at EXIT OPERATION 512.

In another embodiment, as long as the return address is not within suspicious module 308, i.e., is within a legitimate return address range, no further action is taken and flow exits at EXIT OPERATION 512. Conversely, if the return address is within suspicious module, protective action is taken in TAKE PROTECTIVE ACTION OPERATION 510. In this event, since the return address is within suspicious module 308, suspicious module 308 called tracked DLL function 322B directly. This indicates that suspicious module 308 is malicious and so protective action is taken in TAKE PROTECTIVE ACTION OPERATION 510.

Figure 6:
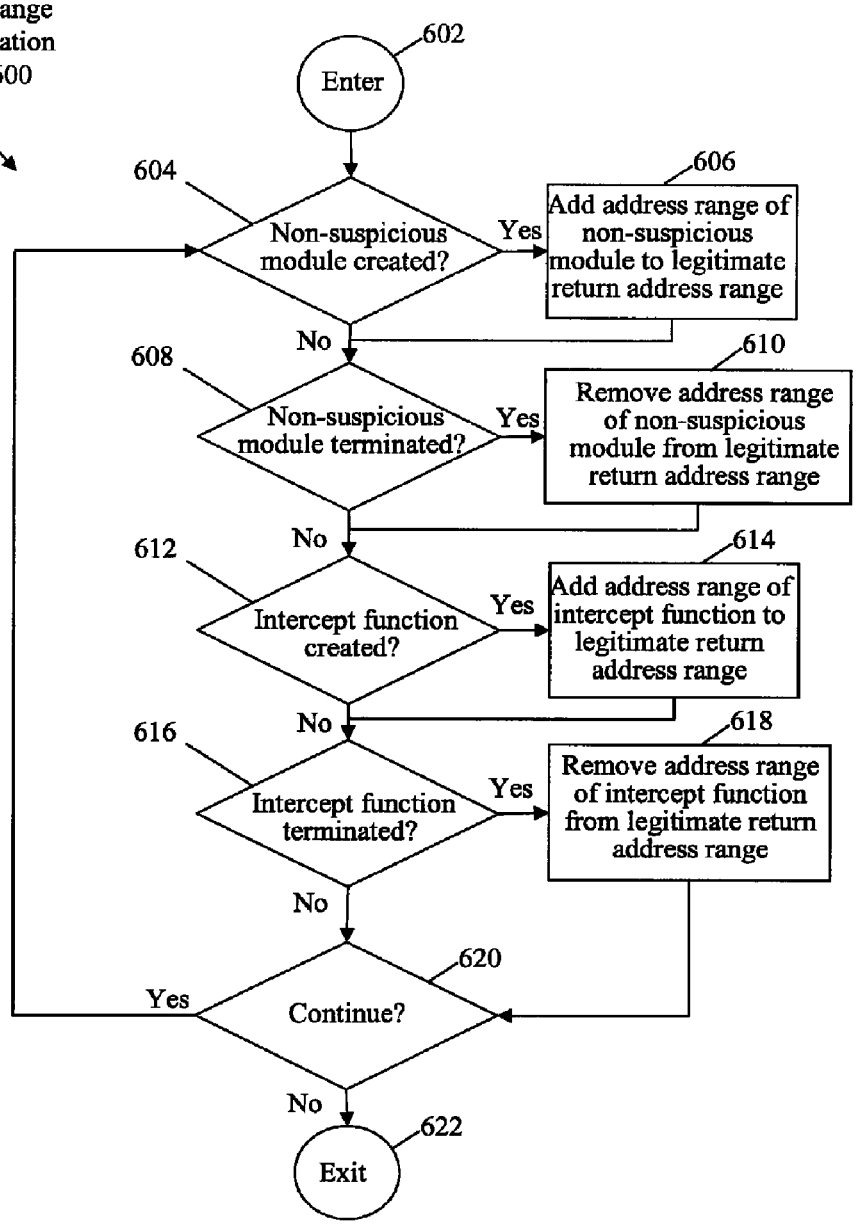
FIG. 6 is a tracked DLL function legitimate return address range determination process in accordance with one embodiment.

FIG. 6 is a tracked DLL function legitimate return address range determination process 600 in accordance with one embodiment. Referring now to FIGS. 1 and 6 together, execution of code module OS interactions intercepting application 106 by processor 108 results in the operations of tracked DLL function legitimate return address range determination process 600 as described below in one embodiment.

From an ENTER OPERATION 602, flow moves to a NON-SUSPICIOUS MODULE CREATED CHECK OPERATION 604. In NON-SUSPICIOUS MODULE CREATED CHECK OPERATION 604, a determination is made as to whether a non-suspicious module has been created, e.g., loaded.

In one embodiment, module creation function(s) are hooked. If the hooked module creation functions(s) are invoked, a determination is made that a module is being created. The module is analyzed to determine whether the module is suspicious or non-suspicious as discussed above.

In another embodiment, upon loading of a DLL into a module, a determination is made as to whether the module is suspicious or non-suspicious. Although a couple of examples are set forth for determining whether a non-suspicious module has been created, other techniques for determining whether a non-suspicious module has been created can be used as will be recognized by one of ordinary skill in the art having the benefit of this disclosure.

If a determination is made that a non-suspicious module has not been created, flow moves from NON-SUSPICIOUS MODULE CREATED CHECK OPERATION 604 to a NON-SUSPICIOUS MODULE TERMINATED CHECK OPERATION 608. Conversely, if a determination is made that a non-suspicious module has been created, flow moves to an ADD ADDRESS RANGE OF NON-SUSPICIOUS MODULE TO LEGITIMATE RETURN ADDRESS RANGE OPERATION 606.

In ADD ADDRESS RANGE OF NON-SUSPICIOUS MODULE TO LEGITIMATE RETURN ADDRESS RANGE OPERATION 606, the address range of the non-suspicious module being created is added to the legitimate return address range. In one embodiment, the legitimate return address range is maintained as a table or other data structure.

From ADD ADDRESS RANGE OF NON-SUSPICIOUS MODULE TO LEGITIMATE RETURN ADDRESS RANGE OPERATION 606, flow moves to NON-SUSPICIOUS MODULE TERMINATED CHECK OPERATION 608. In NON-SUSPICIOUS MODULE TERMINATED CHECK OPERATION 608, a determination is made as to whether a non-suspicious module has been terminated, e.g., unloaded.

In one embodiment, module termination function(s) are hooked. If the hooked module termination functions(s) are invoked, a determination is made that a module is being terminated. The module is analyzed to determine whether the module being terminated is suspicious or non-suspicious as discussed above.

In another embodiment, upon unloading of a DLL from a module, a determination is made as to whether the module is suspicious or non-suspicious. Although a couple of examples are set forth for determining whether a non-suspicious module has been terminated, other techniques for determining whether a non-suspicious module has been terminated can be used as will be recognized by one of ordinary skill in the art having the benefit of this disclosure.

If a determination is made that a non-suspicious module has not been terminated, flow moves from NON-SUSPICIOUS MODULE TERMINATED CHECK OPERATION 608 to an INTERCEPT FUNCTION CREATED CHECK OPERATION 612. Conversely, if a determination is made that a non-suspicious module has been terminated, flow moves to a REMOVE ADDRESS RANGE OF NON-SUSPICIOUS MODULE FROM LEGITIMATE RETURN ADDRESS RANGE OPERATION 610.

In REMOVE ADDRESS RANGE OF NON-SUSPICIOUS MODULE FROM LEGITIMATE RETURN ADDRESS RANGE OPERATION 610, the address range of the non-suspicious module being terminated is removed from the legitimate return address range.

From REMOVE ADDRESS RANGE OF NON-SUSPICIOUS MODULE FROM LEGITIMATE RETURN ADDRESS RANGE OPERATION 610, flow moves to INTERCEPT FUNCTION CREATED CHECK OPERATION 612. In INTERCEPT FUNCTION CREATED CHECK OPERATION 612, a determination is made as to whether an intercept function has been created, e.g., loaded. Creation of intercept functions is discussed in above.

If a determination is made that an intercept function has not been created, flow moves from INTERCEPT FUNCTION CREATED CHECK OPERATION 612 to a INTERCEPT FUNCTION TERMINATED CHECK OPERATION 616. Conversely, if a determination is made that an intercept function has been created, flow moves to an ADD ADDRESS RANGE OF INTERCEPT FUNCTION TO LEGITIMATE RETURN ADDRESS RANGE OPERATION 614.

In ADD ADDRESS RANGE OF INTERCEPT FUNCTION TO LEGITIMATE RETURN ADDRESS RANGE OPERATION 614, the address range of the intercept function being created is added to the legitimate return address range.

From ADD ADDRESS RANGE OF INTERCEPT FUNCTION TO LEGITIMATE RETURN ADDRESS RANGE OPERATION 614, flow moves to INTERCEPT FUNCTION TERMINATED CHECK OPERATION 616. In INTERCEPT FUNCTION TERMINATED CHECK OPERATION 616, a determination is made as to whether an intercept function has been terminated, e.g., unloaded. Termination of intercept functions is discussed above.

If a determination is made that an intercept function has not been terminated, flow moves from INTERCEPT FUNCTION TERMINATED CHECK OPERATION 616 to a CONTINUE CHECK OPERATION 620. Conversely, if a determination is made that an intercept function has been terminated, flow moves to a REMOVE ADDRESS RANGE OF INTERCEPT FUNCTION FROM LEGITIMATE RETURN ADDRESS RANGE OPERATION 618.

In REMOVE ADDRESS RANGE OF INTERCEPT FUNCTION FROM LEGITIMATE RETURN ADDRESS RANGE OPERATION 618, the address range of the intercept function being terminated is removed from the legitimate return address range.

From REMOVE ADDRESS RANGE OF INTERCEPT FUNCTION FROM LEGITIMATE RETURN ADDRESS RANGE OPERATION 618, flow moves to CONTINUE CHECK OPERATION 620. In CONTINUE CHECK OPERATION 620, a determination is made as to whether the legitimate return address range tracking should continue. If not, flow moves from CONTINUE CHECK OPERATION 620 to an EXIT OPERATION 622 and exits. Conversely, flow returns from CONTINUE CHECK OPERATION 620 to NON-SUSPICIOUS MODULE CREATED CHECK OPERATION 604.

Generally, OPERATIONS 604, 608, 612, 616 are continuously performed until a non-suspicious module or intercept function is created or terminated and the legitimate return address range is updated in OPERATIONS 606, 610, 614, or 618.

In the above manner, the legitimate return address range includes the address ranges of non-suspicious modules and intercept functions. Further, the legitimate return address range is dynamically updated as non-suspicious modules and intercept functions are created and terminated.

In another embodiment, a legitimate return address range is maintained for each tracked DLL function individually. For example, different intercept functions are created for different tracked DLL functions. In accordance with this embodiment, the legitimate return address range for a tracked DLL function includes the address ranges of non-suspicious modules and intercept functions specifically created for the tracked DLL function.

Figure 7:
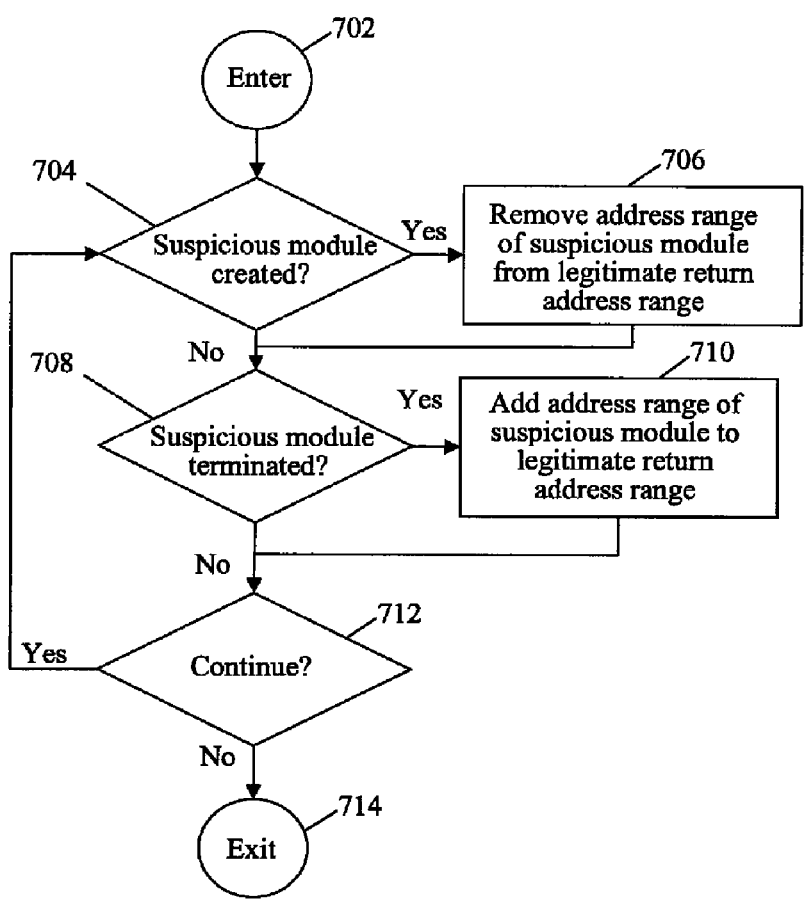
FIG. 7 is a tracked DLL function legitimate return address range determination process in accordance with one embodiment.

FIG. 7 is a tracked DLL function legitimate return address range determination process 700 in accordance with one embodiment. Referring now to FIGS. 1 and 7 together, execution of code module OS interactions intercepting application 106 by processor 108 results in the operations of tracked DLL function legitimate return address range determination process 700 as described below in one embodiment.

From an ENTER OPERATION 702, flow moves to a SUSPICIOUS MODULE CREATED CHECK OPERATION 704. In SUSPICIOUS MODULE CREATED CHECK OPERATION 704, a determination is made as to whether a suspicious module has been created, e.g., loaded.

In one embodiment, module creation function(s) are hooked. If the hooked module creation functions(s) are invoked, a determination is made that a module is being created. The module is analyzed to determine whether the module is suspicious or non-suspicious as discussed above.

In another embodiment, upon loading of a DLL into a module, a determination is made as to whether the module is suspicious or non-suspicious. Although a couple of examples are set forth for determining whether a suspicious module has been created, other techniques for determining whether a suspicious module has been created can be used as will be recognized by one of ordinary skill in the art having the benefit of this disclosure.

If a determination is made that a suspicious module has been created, flow moves from SUSPICIOUS MODULE CREATED CHECK OPERATION 704 to a SUSPICIOUS MODULE TERMINATED CHECK OPERATION 708. Conversely, if a determination is made that a suspicious module has been created, flow moves to a REMOVE ADDRESS RANGE OF SUSPICIOUS MODULE FROM LEGITIMATE RETURN ADDRESS RANGE OPERATION 706.

In REMOVE ADDRESS RANGE OF SUSPICIOUS MODULE FROM LEGITIMATE RETURN ADDRESS RANGE OPERATION 706, the address range of the suspicious module being created is removed from the legitimate return address range. In one embodiment, the address ranges of suspicious modules are maintained as a table or other data structure. The legitimate return address range is defined as any address not within the address ranges of the suspicious modules.

From REMOVE ADDRESS RANGE OF SUSPICIOUS MODULE FROM LEGITIMATE RETURN ADDRESS RANGE OPERATION 706, flow moves to SUSPICIOUS MODULE TERMINATED CHECK OPERATION 708. In SUSPICIOUS MODULE TERMINATED CHECK OPERATION 708, a determination is made as to whether a suspicious module has been terminated, e.g., unloaded.

In one embodiment, module termination function(s) are hooked. If the hooked module termination functions(s) are invoked, a determination is made that a module is being terminated. The module is analyzed to determine whether the module being terminated is suspicious or non-suspicious as discussed above.

In another embodiment, upon unloading of a DLL from a module, a determination is made as to whether the module is suspicious or non-suspicious. Although a couple of examples are set forth for determining whether a suspicious module has been terminated, other techniques for determining whether a suspicious module has been terminated can be used as will be recognized by one of ordinary skill in the art having the benefit of this disclosure.

If a determination is made that a suspicious module has not been terminated, flow moves from SUSPICIOUS MODULE TERMINATED CHECK OPERATION 708 to a CONTINUE CHECK OPERATION 712. Conversely, if a determination is made that a suspicious module has been terminated, flow moves to an ADD ADDRESS RANGE OF SUSPICIOUS MODULE TO LEGITIMATE RETURN ADDRESS RANGE OPERATION 710.

In ADD ADDRESS RANGE OF SUSPICIOUS MODULE TO LEGITIMATE RETURN ADDRESS RANGE OPERATION 710, the address range of the suspicious module being terminated is added to the legitimate return address range. From ADD ADDRESS RANGE OF SUSPICIOUS MODULE TO LEGITIMATE RETURN ADDRESS RANGE OPERATION 710, flow moves to CONTINUE CHECK OPERATION 712.

In CONTINUE CHECK OPERATION 712, a determination is made as to whether the legitimate return address range tracking should continue. If not, flow moves from CONTINUE CHECK OPERATION 712 to an EXIT OPERATION 714 and exits. Conversely, flow returns from CONTINUE CHECK OPERATION 712 to SUSPICIOUS MODULE CREATED CHECK OPERATION 704.

Generally, operations 704, 708 are continuously performed until a suspicious module is created or terminated and the legitimate return address range is updated in operations 706, 710.

In the above manner, the legitimate return address range includes any address except the address ranges of suspicious modules. Further, the legitimate return address range is dynamically updated as suspicious modules are created and terminated.

Referring again to FIG. 1, code module OS interactions intercepting application 106 is in computer memory 114. As used herein, a computer memory refers to a volatile memory, a non-volatile memory, or a combination of the two.

Although code module OS interactions intercepting application 106 is referred to as an application, this is illustrative only. Code module OS interactions intercepting application 106 should be capable of being called from an application or the operating system. In one embodiment, an application is generally defined to be any executable code. Moreover, when it is said that an application or an operation takes some action, the action is the result of executing one or more instructions by a processor as will be recognized by one of ordinary skill in the art having the benefit of this disclosure.

While embodiments have been described for a client-server configuration, an embodiment may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, code module OS interactions intercepting application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the code module OS interactions intercepting functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the code module OS interactions intercepting functionality in accordance with one embodiment can be implemented in a wide variety of computer system configurations. In addition, the code module OS interactions intercepting functionality could be stored as different modules in memories of different devices. For example, code module OS interactions intercepting application 106 could initially be stored in server system 130, and then as necessary, a portion of code module OS interactions intercepting application 106 could be transferred to host computer system 102 and executed on host computer system 102. Consequently, part of the code module OS interactions intercepting functionality would be executed on processor 134 of server system 130, and another part would be executed on processor 108 of host computer system 102. Various embodiments can be implemented in a wide-variety of physical hardware configurations using an operating system and computer programming language of interest to the user.

In yet another embodiment, code module OS interactions intercepting application 106 is stored in memory 136 of server system 130. Code module OS interactions intercepting application 106 is transferred over network 124 to memory 114 in host computer system 102. In this embodiment, network interface 138 and I/O interface 110 would include analog modems, digital modems, or a network interface card. If modems are used, network 124 includes a communications network, and code module OS interactions intercepting application 106 is downloaded via the communications network.

This disclosure provides exemplary embodiments. The scope is not limited by these exemplary embodiments. Numerous variations, whether explicitly provided for by the specification or implied by the specification or not, may be implemented as will be recognized by one of ordinary skill in the art having the benefit of this disclosure.

What is claimed is:

1. A computer-implemented method comprising:
    determining that one or more modules to be loaded into a process is suspicious, the determination of suspiciousness depending on one or more user-configurable factors, the determination resulting in one or more suspicious modules;
    creating intercept functions for a tracked Dynamic Link Library (DLL) function of a Dynamic Link Library (DLL) being loaded into the one or more suspicious modules; and
    determining whether said tracked DLL function is invoked, wherein upon a determination that said tracked DLL function is invoked, said method further comprising:
    determining whether a return address of a caller of said tracked DLL function is within a legitimate return address range that corresponds to non-suspicious modules to determine whether said tracked DLL function is being directly called from said one or more suspicious modules, wherein in no legitimate event should said tracked DLL function be called directly from said one or more suspicious modules, said legitimate return address range comprising address ranges of said intercept functions, said legitimate return address range excluding address ranges of said one or more suspicious modules, and wherein said legitimate return address memory range comprises address ranges of said non-suspicious modules; and dynamically updating said legitimate return address range, that corresponds to said non-suspicious modules and said intercept functions, when said non-suspicious modules and said intercept functions are created and terminated.

2. The computer-implemented method of claim 1 further comprising:
replacing an import address table entry for said tracked DLL function with an address of said intercept function.

3. The computer-implemented method of claim 1 further comprising hooking a prologue of said tracked DLL function.

4. The computer-implemented method of claim 3 wherein said hooking a prologue of said tracked DLL function comprises inserting a jump instruction into said tracked DLL function.

5. The computer-implemented method of claim 1 wherein said tracked DLL function is invoked when said caller calls said tracked DLL function.

6. The computer-implemented method of claim 1 wherein said return address is pushed on to a call stack when said tracked DLL function is called.

7. The computer-implemented method of claim 6 wherein said determining whether a return address of a caller of said tracked DLL function is within a legitimate return address range comprises reading said return address from said call stack.

8. The computer-implemented method of claim 7 wherein said return address is a pointer to a memory location where control is to be returned upon completion of said tracked DLL function.

9. The computer-implemented method of claim 1 further comprising determining said legitimate return address range comprising:
adding an address range of a non-suspicious module to said legitimate return address range upon a determination that said non-suspicious module is being created;
removing said address range of said non-suspicious module from said legitimate return address range upon a determination that said non-suspicious module is being terminated;
adding an address range of an intercept function to said legitimate return address range upon a determination that said intercept function is being created; and
removing said address range of said intercept function from said legitimate return address range upon a determination that said intercept function is being terminated.

10. The computer-implemented method of claim 1 wherein said legitimate return address range comprises any address except an address within said address ranges of said one or more suspicious modules.

11. The computer-implemented method of claim 10 further comprising determining said legitimate return address range comprising:
removing an address range of a suspicious module of the one or more suspicious modules from said legitimate return address range upon a determination that said suspicious module is being created; and
adding said address range of said suspicious module of the one or more suspicious modules to said legitimate return address range upon a determination that said suspicious module is being terminated.

12. The computer-implemented method of claim 1 wherein upon a determination that said return address is within said legitimate return address range, said method further comprising taking no further action.

13. The computer-implemented method of claim 1 wherein upon a determination that said return address is not within said legitimate return address range, said method further comprising taking protective action.

14. The computer-implemented method of claim 13 wherein said taking protective action comprises preventing said tracked DLL function from being executed.

15. The computer-implemented method of claim 13 wherein said taking protective action comprises defining said caller as a malicious module.

16. The computer-implemented method of claim 15 wherein said taking protective action further comprises restarting a general process comprising said malicious module and preventing said malicious module from being reloaded into said general process.

17. A computer system comprising:
a memory having stored therein a code module operating system (OS) interactions intercepting application; and
a processor coupled to said memory, wherein execution of said code module OS interactions intercepting application generates a method comprising:
determining that one or more modules to be loaded into a process is suspicious, the determination of suspiciousness depending on one or more user-configurable factors, the determination resulting in one or more suspicious modules;
creating intercept functions for a tracked Dynamic Link Library (DLL) function of a Dynamic Link Library (DLL) being loaded into the one or more suspicious modules; and
determining whether said tracked DLL function is invoked, wherein upon a determination that said tracked DLL function is invoked, said method further comprising:
determining whether a return address of a caller of said tracked DLL function is within a legitimate return address range that corresponds to non-suspicious modules to determine whether said tracked DLL function is being directly called from said one or more suspicious modules, wherein in no legitimate event should said tracked DLL function be called directly from said one or more suspicious modules, said legitimate return address range comprising address ranges of said intercept functions, said legitimate return address range excluding address ranges of said one or more suspicious modules, and wherein said legitimate return address memory range comprises address ranges of said non-suspicious modules; and
dynamically updating said legitimate return address range, that corresponds to said non-suspicious modules and said intercept functions, when said non-suspicious modules and said intercept functions are created and terminated.

18. A computer-program product comprising a tangible non-transitory computer readable storage medium containing computer program code comprising:
a code module operating system (OS) interactions intercepting application for, determining that one or more modules to be loaded into a process is suspicious, the determination of suspiciousness depending on one or more user-configurable factors, the determination resulting in one or more suspicious modules, the code module further for creating intercept functions for a tracked Dynamic Link Library (DLL) function of a Dynamic Link Library (DLL) being loaded into the one or more suspicious modules; and
said code module OS interactions intercepting application further for determining whether said tracked DLL function is invoked, wherein upon a determination that said tracked DLL function is invoked, said code module OS interactions intercepting application further for:

determining whether a return address of a caller of said tracked DLL function is within a legitimate return address range that corresponds to non-suspicious modules to determine whether said tracked DLL function is being directly called from said one or more suspicious modules, wherein in no legitimate event should said tracked DLL function be called directly from said one or more suspicious modules, said legitimate return address range comprising address ranges of said intercept functions, said legitimate return address range excluding address ranges of said one or more suspicious module, and wherein said legitimate return address memory range comprises address ranges of said non-suspicious modules; and dynamically updating said legitimate return address range, that corresponds to said non-suspicious modules and said intercept functions, when said non-suspicious modules and said intercept functions are created and terminated.

* * * * *